United States Patent
Lee et al.

(10) Patent No.: US 8,796,989 B2
(45) Date of Patent: Aug. 5, 2014

(54) WIRELESS CHARGER FOR CHARGING CONTROL AND CHARGING CONTROL METHOD THEREFOR

(75) Inventors: Woo-Ram Lee, Gimpo-si (KR);
Sung-Kweon Park, Seongnam-si (KR);
Ki-Hyun Kim, Suwon-si (KR);
Hong-Kweun Kim, Ansan-si (KR);
Se-Ho Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 12/914,028

(22) Filed: Oct. 28, 2010

(65) Prior Publication Data

US 2011/0115433 A1   May 19, 2011

(30) Foreign Application Priority Data

Nov. 13, 2009   (KR) .................. 10-2009-0109738

(51) Int. Cl.
*H02J 7/00* (2006.01)
(52) U.S. Cl.
USPC ........................................ 320/108; 307/150
(58) Field of Classification Search
USPC .......................................... 320/108; 307/150
See application file for complete search history.

(56) References Cited

U.S. PATENT DOCUMENTS

| | | | | |
|---|---|---|---|---|
| 4,031,449 A * | 6/1977 | Trombly | | 320/108 |
| 5,995,084 A * | 11/1999 | Chan et al. | | 345/173 |
| 6,650,213 B1 * | 11/2003 | Sakurai et al. | | 335/296 |
| 7,164,255 B2 * | 1/2007 | Hui | | 320/108 |
| 7,399,202 B2 * | 7/2008 | Dayan et al. | | 439/504 |
| 7,622,891 B2 * | 11/2009 | Cheng et al. | | 320/108 |
| 8,129,939 B2 * | 3/2012 | Locker et al. | | 320/103 |
| 8,262,244 B2 * | 9/2012 | Metcalf et al. | | 362/127 |
| 2002/0018025 A1 * | 2/2002 | Matsuda et al. | | 343/895 |
| 2008/0116847 A1 * | 5/2008 | Loke et al. | | 320/108 |

OTHER PUBLICATIONS

All About Electronic Circuits, Flat Spiral Coil Inductor Calculator, Apr. 17, 2008.*
Integrated Publishing, Inductors, Dec. 15, 2000.*
Webster's Online Dictionary, Inductor, Jan. 4, 2008.*
Electronics-Tutorials.ws, Mutual Inductance Between Two Coils, Oct. 11, 2009.*

* cited by examiner

*Primary Examiner* — Drew A Dunn
*Assistant Examiner* — Michael Dibenedetto
(74) *Attorney, Agent, or Firm* — The Farrell Law Firm, P.C.

(57) ABSTRACT

A coil structure and a charging control method in a wireless charger having a primary coil are provided to supply an induced electromotive force suitable for a charging target having a secondary coil. Concentric coils having different radii are arranged in a wireless charger, and a coil suitable for the location of a charging target placed on the wireless charger is selected. An input power corresponding to the selected coil is determined, and the determined power is applied to the selected coil. Then the same charging efficiency can be provided irrespective of a location of a charging target placed on the wireless charger.

9 Claims, 5 Drawing Sheets

WIRELESS CHARGER FOR CHARGING CONTROL AND CHARGING CONTROL METHOD THEREFOR

PRIORITY

This application claims priority under 35 U.S.C. §119(a) to a Korean Patent Application filed in the Korean Intellectual Property Office on Nov. 13, 2009 and assigned Serial No. 10-2009-0109738, the entire disclosure of which is hereby incorporated by reference.

BACKGROUND OF THE INVENTION

1. Field of the Invention

The present invention relates generally to a wireless charger, and more particularly, to a wireless charger and a charging control method therefor, which can supply an optimal induced electromotive force according to where a charging target is placed on the wireless charger.

2. Description of the Related Art

Generally, for operation of a mobile terminal, a power should be continuously supplied. To this end, the mobile terminal includes a battery which is generally charged by a charger. In a charging method, research on non-contact charging methods and wireless charging methods have been conducted to support mobility of the mobile terminal.

In the wireless charging method, the location of a coil in a mobile terminal which is a target to be charged (hereinafter, "charging target"), and the location of a coil in a charger which charges the mobile terminal are important factors in determining charging efficiency. To improve charging efficiency, techniques for arranging coils of a charging target and a wireless charger are presently being studied.

FIGS. 1A and 1B illustrate examples of a general wireless charging method. As illustrated in FIGS. 1A and 1B, a currently used wireless charging method includes an arrangement charging type and a multicoil charging type.

In the arrangement charging type, a user directly arranges a charging target 10 on a wireless charger 20 of a cradle type or arranges the location of the charging target 10 by using a magnetic force employing a magnet included in the wireless charger 20. In the multicoil charging type, a plurality of coils are arranged in a wireless charger 30 and coils corresponding to the location of a charging target are selected for charging from among the plurality of coils.

In this way, the conventional wireless charging method uses the arrangement between coils. However, since the arrangement is performed by a user using his/her hands or by using a magnet, it may be inconvenient for a user and charging efficiency may be decreased due to an inaccurate arrangement. In the multicoil charging type, since many coils are used, charging efficiency is lowered, costs are increased, and it is difficult to control individual coils. Accordingly, a method is needed which can supply an optimal induced electromotive force according to the location of a charging target in a wireless charger in consideration of convenience for users.

SUMMARY OF THE INVENTION

An aspect of the present invention is to address at least the above-mentioned problems and/or disadvantages and to provide at least the advantages described below. Accordingly, an aspect of the present invention provides a wireless charger and a charging control method therefore, for supplying an optimal induced electromotive force according to the location of a charging target.

In accordance with an aspect of embodiments of the present invention, a charging control method in a wireless charger including a primary coil for performing charging through a secondary coil included in a charging target, includes sensing whether the charging target is placed on the wireless charger including one or more concentric coils having different radiuses, checking the location on which the charging target is placed, selecting a coil to be activated among the one more coils according the checked location, determining a power to be applied to the selected coil, and supplying the determined power to the selected coil.

In accordance with another aspect of embodiments of the present invention, a wireless charger for charging control, including a primary coil for performing charging through a secondary coil included in a charging target, includes one or more concentric coils having different radiuses, a touch pad provided on one surface of the wireless charger, a location sensor included in the touch pad, for sensing whether the charging target is placed on the touch pad and providing information about location where the charging target is placed, a controller for selecting a coil to be activated among the one more coils according the location information provided by the location sensor, and a power determiner for determining a power to be applied to the selected coil and supplying the determined power to the selected coil.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

The present invention provides a coil structure and a charging control method in a wireless charger having a primary coil, thereby supplying an induced electromotive force suitable for a charging target having a secondary coil. To this end, concentric coils having different radii are arranged in a wireless charger, and a coil suitable for the location of a charging target placed on the wireless charger is selected. Next, an input power corresponding to the selected coil is determined, and the determined power is applied to the selected coil. Then the same charging efficiency can be provided irrespective of a location of a charging target placed on the wireless charger.

A configuration of a wireless charging system having the above-described function will now be described with reference to FIG. 2, which is a diagram illustrating a configuration of a wireless charging system in accordance with an embodiment of the present invention.

Figure 1A:
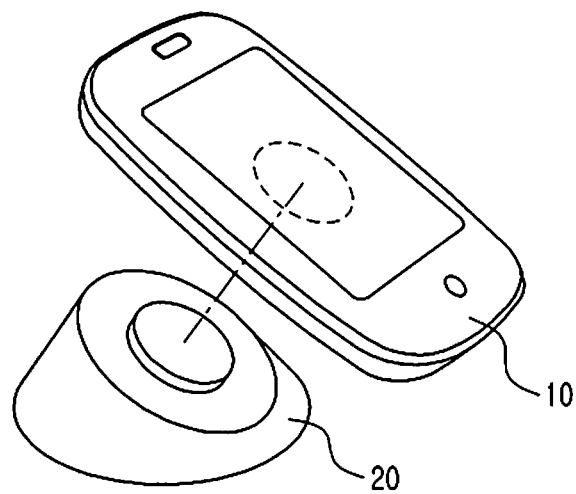
FIGS. 1A and 1B are diagrams illustrating examples of a general wireless charging method.
Figure 1B:
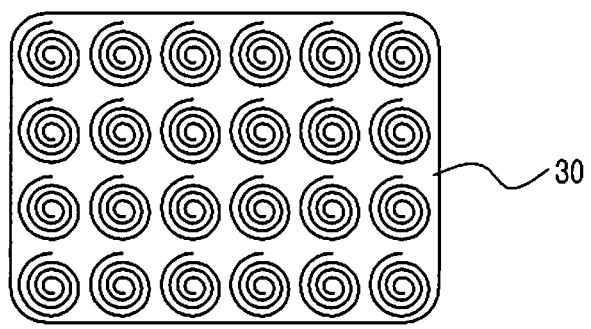
Figure 2:
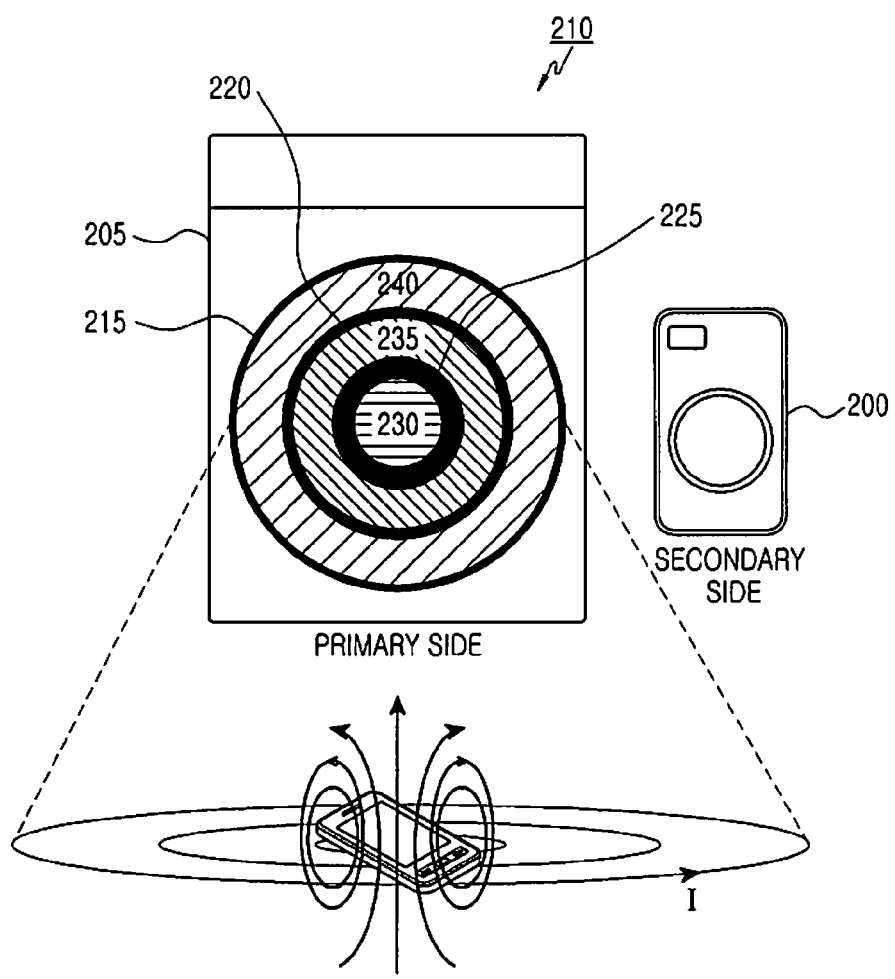
FIG. 2 is a diagram illustrating a wireless charger and a charging target in accordance with an embodiment of the present invention.

Referring to FIG. 2, the wireless charging system includes a wireless charger 210 corresponding to a primary side and a charging target 200 corresponding to a secondary side. For charging, the charging target 200 is placed on a touch pad 205 located on one surface of the wireless charger 210. The charging target 200 includes a secondary coil and is charged through inductive coupling with a primary coil included in the wireless charger 210. The primary coil generates a magnetic field so as to perform charging through inductive coupling with the secondary coil.

One or more concentric coils 215, 220 and 225 having different radii are arranged in the wireless charger 210. Although FIG. 2 shows an example of using 3 helical coils, the coils may be changeable when the same principle is applied according to the present invention and the number of coils is not limited thereto. As shown in FIG. 2, the 3 coils with different radii have the same center and these coils may be helical coils of which wound shape is a plane circular type or a plane polygonal type. An area on which the charging target 200 is placed may be divided into three parts 230, 235 and 240 according to the coils. Since the coils 215, 220 and 225 constituting the primary coil have different radii, the coils 215, 220 and 225 have different numbers of turns so that the same inductance can be generated therefrom. For a coil having a large radius, the number of turns of the coil is small.

The wireless charger 210 having the above-described structure uses a resonance method. The wireless charger 210 determines any one of the coils constituting the primary coil according to the location of the secondary coil, determines a power corresponding to the location of the determined coil, and supplies the power to the determined coil. Namely, even though the charging target 200 is placed at any location on the wireless charger 210, the wireless charger 210 selects the primary coil suitable for the location of the charging target 200 and arranges the selected primary coil with the secondary coil, thereby improving charging efficiency. If the location of the charging target 200 is changed while charging is performed, since the wireless charger 210 can identify the changed location, it can perform charging through a coil suitable for the changed location.

The components of the wireless charger 210 operating as described above are shown in FIG. 3, which is a block diagram illustrating an internal configuration of the wireless charger 210 in accordance with an embodiment of the present invention.

Figure 3:
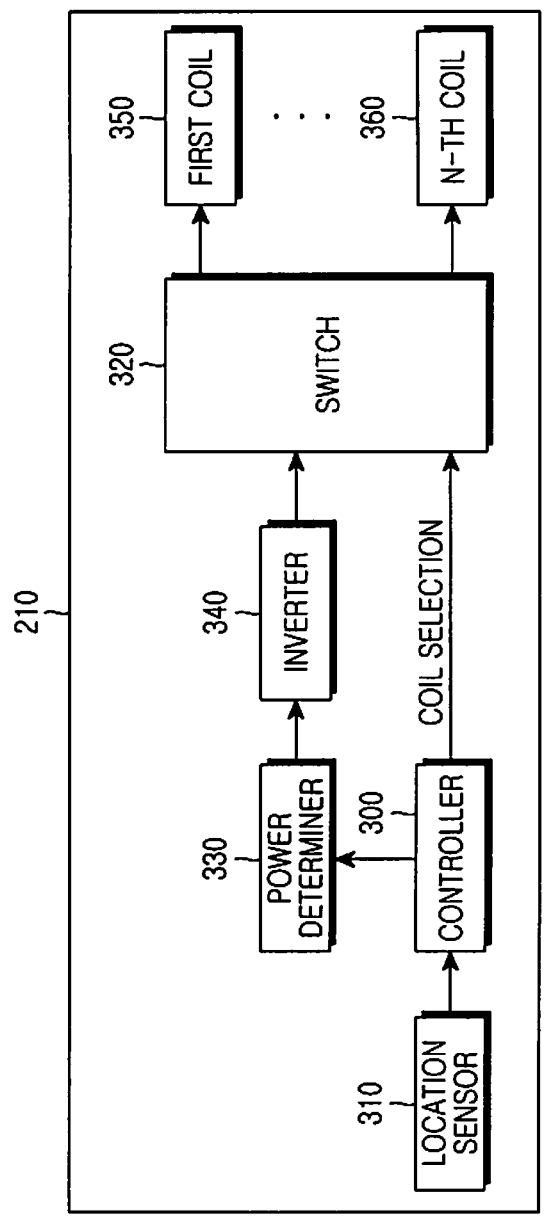
FIG. 3 is a block diagram illustrating an internal configuration of the wireless charger of FIG. 2.

Referring to FIG. 3, the wireless charger 210 includes a controller 300, a location sensor 310, a power determiner 330, an inverter 340, a switch 320, and one or more coils 350 to 360.

The location sensor 310 senses a location of a charging target placed on the wireless charger 210. The location sensor 310 is included in the touch pad 205 of the wireless charger 210 and is comprised of a sensor, such as a pressure sensor for example, which can sense locations. If the charging target 200 is placed on the touch pad 205, the location sensor 310 senses the location of the charging target 200 and generates a signal for coil selection.

The location sensor 310 transmits the signal indicating the location of the charging target 200 to the controller 300. Then the controller 300 selects a coil to be activated based on the signal. In addition, the controller 300 provides the power determiner 330 with information about the location of the charging target 200 and information about the selected coil so that the power determiner 330 may determine an input power which is to be applied to the selected coil.

The coils 350 to 360 should have the same inductance in order to meet a frequency used for wireless charging, because resonant conditions are satisfied when the coils have the same inductance. A greater induced electromotive force is generated at the edge of the primary coil relative to the center thereof. Accordingly, when using the resonance method, the efficiency of a coil can be increased by activating a coil which can produce the greatest power. Since the resonance method is applied, the coils may have a polygonal shape, such as a rectangle, although the coils 215, 220 and 225 of a planar helical shape are shown in FIG. 2.

To generate the same inductance, the number of turns of each of the coils 350 to 360 becomes smaller as the radius thereof is increased. This relationship is indicated in the following Equation (1). However, an equation used to calculate an inductance, showing a relationship between the number of turns of a coil and the radius thereof is not limited to Equation (1).

$$L = \frac{r^2 N^2}{(2r + 2.8d) \times 10^5} \quad (1)$$

where L denotes an inductance, r denotes the radius of a coil, N denotes the number of turns of a coil, and d denotes the depth of a coil, which is obtained by subtracting the inner radius of a coil from the outer radius thereof. Since the strength of a focused magnetic flux decreases as the radius of a coil increases, greater power should be provided to a coil having a large radius. However, a magnetic flux, which can perform charging, is formed at the edge of the coil.

The power determiner 330 determines a power corresponding to each of the coils 350 to 360 having different radii. Here, since the strength of a focused magnetic flux decreases as the radius of a coil increases, greater power should be provided. The power determiner 330 determines a power suitable for each coil so that each coil can generate an inductance satisfying a frequency used for charging. A user may place the charging target 200 on an arbitrary location of the wireless charger 210. Hence, the controller 300 selects a primary coil facing the coil of the charging target 200 from the coils 350 to 360. In this case, even though the primary coil is selected according to the location of the charging target 200, the strength of a magnetic flux should be compensated for in consideration of the location of the charging target 200 so that the same induced electromotive force as an induced electromotive force when the primary coil is arranged with the coil of the charging target 200 can be generated.

Upon receiving information about the location of the charging target 200 and information about the selected coil from the controller 300, the power determiner 330 determines an input power based on the received information. Although power increases as the radius of a coil increases, an input power can be determined through the known radius of a coil. However, since the actual location of the charging target 200 may not be accurately arranged on the selected coil, compensation is performed upon a distance between the location of the charging target 200 and the location of the selected coil. For example, an input power may be adjusted according to a distance between the center of the selected coil and the location of the charging target 200. Therefore, the power determiner 330 of the present invention determines an input power according to a distance between the center of the selected coil and the location of the charging target 200.

The determined input power is converted into an Alternate Current (AC) power by the inverter 340 and then is applied to the selected coil via the switch 320. The switch 320 is connected to at least one coil. The switch 320 functions to select a coil determined by the controller 300.

An operation of the wireless charger 210 having the above-described configuration will now be described with reference to FIG. 4.

Figure 4:
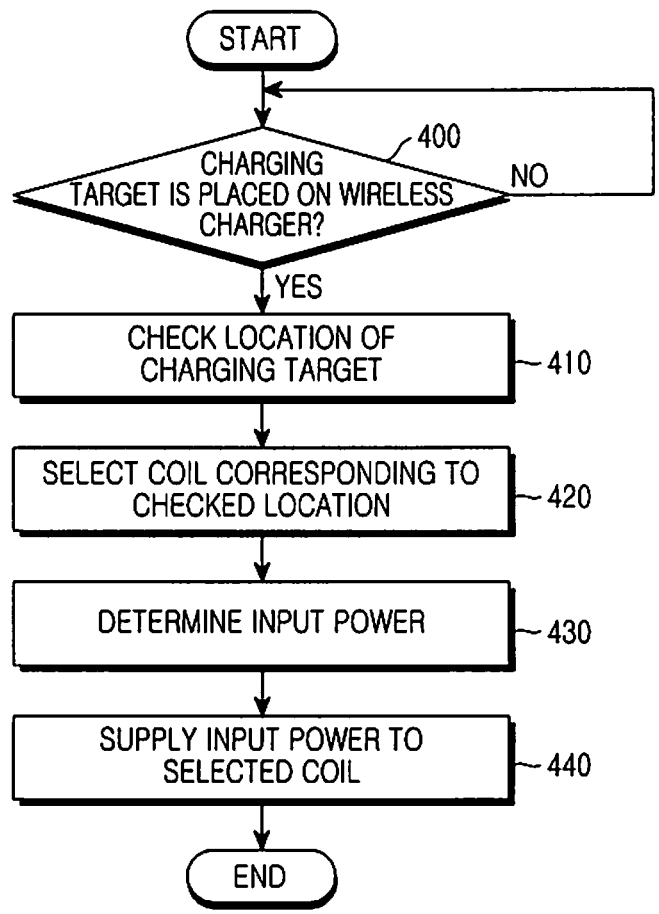
FIG. 4 is a flow chart illustrating an operation of a wireless charger for charging control according to the location of a charging target in accordance with an embodiment of the present invention.

Referring to FIG. 4, a user may place the charging target 200 at an arbitrary location on the touch pad 205. The wireless charger 210 determines whether the charging target 200 is placed on a wireless charger 210, that is, the touch pad 205, in step 400. Whether the charging target 200 is placed on the touch pad 205 is sensed by the location sensor 310, such as a pressure sensor. If it is determined that the charging target 200 is placed on the wireless charger 210, the wireless charger 210 checks the location of the charging target 200 in step 410 and selects a coil corresponding to the checked location in step 420. Referring to FIG. 2, the wireless charger 210 determines which area the charging target 200 is placed and selects a coil to which the determined area belongs or the nearest coil from the determined area. This is to select a primary coil which can supply the greatest induced electromotive force under the state that the primary coil faces a secondary coil of the charging target 200. Accordingly, even if a user arbitrarily puts the charging target 200 on the wireless charger 210, the wireless charger 210 selects a coil corresponding to the location of the charging target 200 and compensates for a power so as to be same as a power when the selected coil is arranged with the secondary coil. Hence, power efficiency is increased and a degree of freedom is improved.

In this case, a power to be applied to the selected coil should be adjusted such that the same charging as when the secondary coil and the selected primary coil are arranged can be performed. Namely, power is controlled so as to supply an induced electromotive force which is provided at a constant frequency. To this end, the wireless charger 210 determines an input power to be applied to the selected coil based on the information about the location of the charging target 200 and the information about the selected coil in step 430. The wireless charger 210 then supplies the determined input power to the selected coil in step 440.

Figure 5:
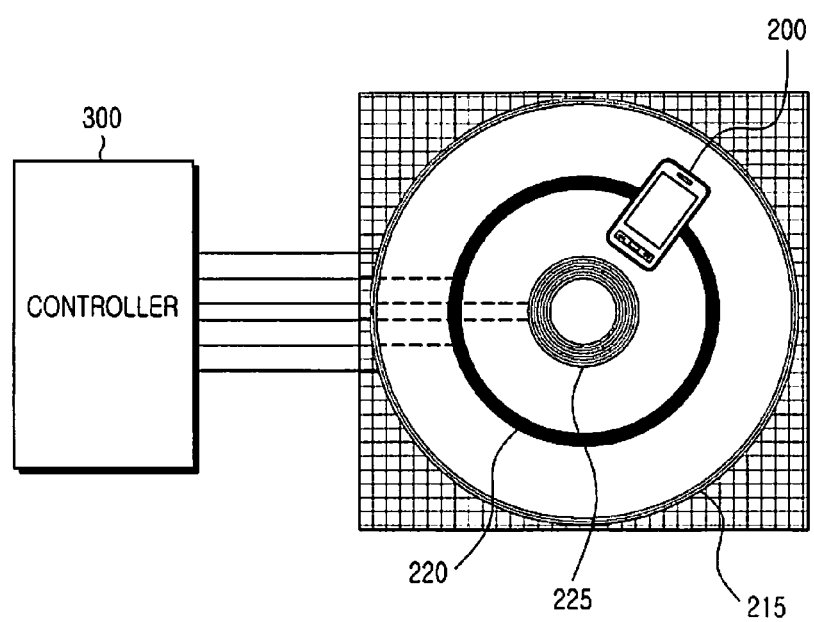
FIG. 5 is a diagram for explaining an operation of a wireless charger for charging control according to the location of a charging target in accordance with an embodiment of the present invention.

An example is shown in FIG. 5 in which the charging target 200 is placed on the wireless charger 210 having a primary coil comprised of the three coils 215, 220 and 225. In this state, the controller 300 selects the central coil 220 based on the location of the charging target 200 and therefore, only the coil 220 among the three coils 215, 220 and 225 is activated to charge the charging target 200.

According to embodiments of the present invention, the wireless charger has one or more helical coils of a concentric structure. If a user places a charging target on the wireless charger, the wireless charger performs charging through a coil suitable for the charging target and therefore the convenience of a user is increased. Moreover, since the wireless charger determines only a coil to be activated irrespective of a movement or arrangement of a primary coil of the wireless charger, charging efficiency is increased and cost competitiveness can be ensured. Furthermore, since charging can be performed according to the location of the charging target, a degree of freedom in the location of the charging target is improved and a plurality of charging targets can be simultaneously charged.

Although the embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. A charging control method in a wireless charger including a primary coil for performing charging through a secondary coil included in a charging target, the method comprising:
sensing whether the charging target is placed on the wireless charger, the wireless charger including a plurality of flat spiral concentric coils having different radii;
checking a location on which the charging target is placed;
selecting a coil to be activated from among the plurality of coils according the checked location;
determining a power to be applied to the selected coil; and
supplying the determined power to the selected coil,
wherein the plurality of flat spiral concentric coils having different radii have smaller numbers of turns as the radii thereof increase so as to generate the same inductance among the flat spiral concentric coils.

2. The charging control method of claim 1, wherein sensing whether the charging target is placed on the wireless charger comprises sensing the location of the charging target by a location sensor included in a touch pad, if the charging target is placed on the touch pad provided on one surface of the wireless charger.

3. The charging control method of claim 1, wherein selecting the coil to be activated comprises:
checking an area corresponding to the location where the charging target is placed among areas distinguished by the plurality of coils; and
selecting a coil corresponding to the checked area.

4. The charging control method of claim 1, wherein determining power to be applied to the selected coil comprises determining the power according to a distance between the center of the plurality of coils and the location of the charging target.

5. A wireless charger for charging control, including a primary coil for performing charging through a secondary coil included in a charging target, the wireless charger comprising:
a plurality of flat spiral concentric coils having different radii;
a touch pad provided on one surface of the wireless charger;
a location sensor included in the touch pad, for sensing whether the charging target is placed on the touch pad and providing information about a location where the charging target is placed;
a controller for selecting a coil to be activated among the plurality of coils according the location information provided by the location sensor; and
a power determiner for determining power to be applied to the selected coil and supplying the determined power to the selected coil,
wherein the plurality of flat spiral concentric coils having different radii have smaller numbers of turns as the radii thereof increase so as to generate the same inductance among the plurality of flat spiral concentric coils.

6. The wireless charger of claim 5, wherein the location sensor is a pressure sensor.

7. The wireless charger of claim 5, wherein the power determiner determines the power according to a distance between the center of the plurality of coils and the location of the charging target.

8. The wireless charger of claim 5, further comprising:
an inverter for receiving the determined power from the power determiner and converting the determined power into an AC power; and
a switch connected to the plurality of coils, for supplying the AC power to the selected coil.

9. The wireless charger of claim 5, wherein the controller checks an area corresponding to a location where the charging target is placed among areas distinguished by the plurality of coils and selects a coil corresponding to the checked area.

* * * * *